United States Patent
Pennetreau et al.

(10) Patent No.: US 6,224,845 B1
(45) Date of Patent: May 1, 2001

(54) PROCESS FOR MANUFACTURING AN AQUEOUS HYDROGEN PEROXIDE SOLUTION

(75) Inventors: Pascal Pennetreau, Rixensart (BE); Alain Vandenbussche, Northwich (GB)

(73) Assignee: Solvay S.A. (BE)

( * ) Notice: Subject to any disclaimer, the term of this patent is extended or adjusted under 35 U.S.C. 154(b) by 0 days.

(21) Appl. No.: 09/334,641

(22) Filed: Jun. 17, 1999

(30) Foreign Application Priority Data

Jun. 18, 1998 (BE) .................................................. 09800468

(51) Int. Cl.[7] .................................................. C01B 15/013
(52) U.S. Cl. ...................... 423/584; 423/272; 423/587; 423/588
(58) Field of Search .................................... 423/584, 587, 423/588, 272

(56) References Cited

U.S. PATENT DOCUMENTS

| | | |
|---|---|---|
| 3,321,279 | 5/1967 | Williams et al. . |
| 5,302,367 | 4/1994 | Signorini et al. ..................... 423/588 |
| 5,670,028 | * 9/1997 | Inaba ...................................... 203/86 |

FOREIGN PATENT DOCUMENTS 0 529 723   3/1993   (EP) .

OTHER PUBLICATIONS

"Hawley's Condensed Chemical Dictionary", 13ed. pp. 153 and 591.*

* cited by examiner

Primary Examiner—Steven P. Griffin
Assistant Examiner—Maribel Medina
(74) Attorney, Agent, or Firm—Larson & Taylor, PLC

(57) ABSTRACT

Process for manufacturing a purified aqueous hydrogen peroxide solution, in which a crude aqueous hydrogen peroxide solution is subjected to a washing operation with at least one organic solvent which has been subjected to a purification treatment prior to the washing operation.

Aqueous hydrogen peroxide solution with a TOC, defined according to ISO standard 8245, of less than or equal to 72 mg/l.

12 Claims, 1 Drawing Sheet

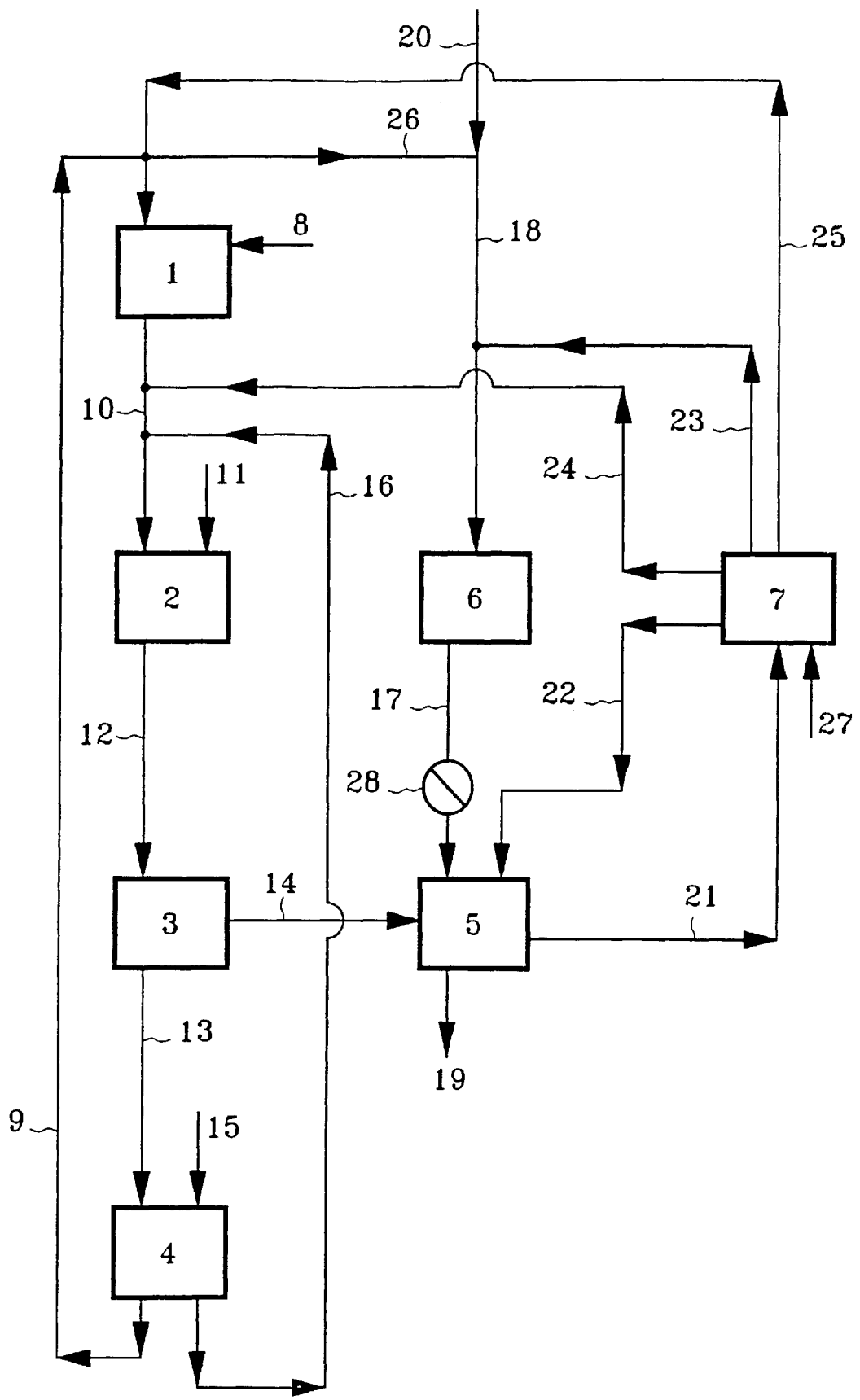

PROCESS FOR MANUFACTURING AN AQUEOUS HYDROGEN PEROXIDE SOLUTION

The present invention relates to an improved process for manufacturing a purified aqueous hydrogen peroxide solution.

It is known practice (patent application EP 0,529,723 A1 in the name of lnterox International) to obtain a purified aqueous hydrogen peroxide solution according to the alkylanthraquinone process. In this known process, a crude aqueous hydrogen peroxide solution is introduced into a purifier fed with organic solvent. The aqueous hydrogen peroxide solution collected at the purifier outlet is then subjected to distillation. Some of the distillation residue is recycled into the oxidation step of the alkylanthraquinone process. The aqueous hydrogen peroxide solution obtained according to this known process contains a large amount of organic compounds. When the nature of these organic compounds is examined, it is seen that there are a variety of organic compounds present The chemical constitution of these organic compounds can be determined, for example, by GC/MS (gas chromatography/mass spectrometry). Distillation treatments allow the boiling points of the said compounds to be indicated. It has been found that a large fraction of the organic compounds comprises from 7 to 11 carbon atoms and at least one oxygen atom and has a boiling point of from 200° C. to 300° C. The organic impurities render the aqueous hydrogen peroxide solution of little use, in particular for electronic applications. It is thus desirable to provide an aqueous hydrogen peroxide solution which has a reduced content of organic impurities. It is also desirable to obtain the aqueous hydrogen peroxide solution in an economically and technically advantageous manner, for example by consuming a minimum amount of starting materials and fresh reagents.

The invention is directed towards overcoming this problem by providing an improved process for purifying an aqueous hydrogen peroxide solution, which gives a high purity of organic compounds while remaining economically advantageous.

Consequently, the invention relates to a process for manufacturing a purified aqueous hydrogen peroxide solution, in which a crude aqueous hydrogen peroxide solution is subjected to a washing operation with at least one organic solvent which has been subjected to a purification treatment prior to the washing operation.

It has been found, surprisingly, that the washing of a crude aqueous hydrogen peroxide solution with a solvent which has been subjected to a purification treatment prior to the washing solves the problem posed above. Washing removes most of the impurities usually found in the aqueous hydrogen peroxide solutions after a distillation treatment.

The term "washing" is intended to denote any treatment, which is well known in the chemical industry, of a crude aqueous hydrogen peroxide solution with an organic solvent which is intended to reduce the content of impurities in the aqueous hydrogen peroxide solution. This washing can consist, for example, in extracting impurities in the crude aqueous hydrogen peroxide solution by means of an organic solvent in apparatuses such as centrifugal extractors or liquid/liquid extraction columns, for example, operating counter-currentwise. Liquid/liquid extraction columns are preferred. Among the liquid/liquid extraction columns, columns with perforated plates are preferred.

The expression "crude aqueous hydrogen peroxide solution" is intended to denote the solutions obtained directly from a hydrogen peroxide synthesis step or from a hydrogen peroxide extraction step or from a storage unit. The crude aqueous hydrogen peroxide solution can have undergone one or more treatments to separate out impurities prior to the washing operation according to the process of the invention.

It is preferred to bring the organic solvent in counter-current relative to the crude aqueous hydrogen peroxide solution. The efficacy of the washing depends on the flow rate of the organic solvent. The efficacy of the washing is improved when the flow rate of the organic solvent is increased. The volume of organic solvent used for the washing is defined as the quotient of the flow rate of solvent and of the flow rate of the hydrogen peroxide solution. The volume used in the process according to the invention is generally at least 3 l per $m^3$ of crude aqueous hydrogen peroxide solution. Preferably, the volume is at least 25 l per $m^3$ of aqueous hydrogen peroxide solution. The volume is generally not more than 100 l per $m^3$ of aqueous hydrogen peroxide solution. The volume is preferably not more than 75 l per $m^3$ of aqueous hydrogen peroxide solution. The washing temperature is generally at least 10° C. It is preferred to work at a temperature of at least 20° C. Generally, the temperature is not more than 60° C., preferably not more than 40° C. The washing time depends on the size of the apparatus chosen and on the flow rate of crude aqueous hydrogen peroxide solution introduced into the apparatus.

In the process according to the invention, polar solvents, nonpolar solvents and mixtures thereof can be used as organic solvent. It is preferred to use a mixture of polar solvent and of nonpolar solvent The polar solvents ensure good extraction of the impurities. The nonpolar solvents ensure good phase separation since they are immiscible with water.

Nonpolar solvents which can be used, for example, are an aliphatic and/or aromatic hydrocarbon or a mixture thereof These hydrocarbons are, for example, benzene or benzene derivatives comprising from 1 to 5 alkyl substituents. Generally, the alkyl substituents contain from 1 to 5 carbon atoms. Haloaliphatic and/or haloaromatic hydrocarbons such as methylene chloride can optionally be used.

Polar solvents which can be chosen, for example, are an alcohol or a mixture of alcohols, an amide, a carboxylic or phosphoric acid ester, an alkylphosphate or a mixture of at least two of these solvents. Linear or branched secondary aliphatic alcohols give good results. Diisobutylcarbinol is suitable for use.

In the process according to the invention, the organic solvent is subjected to a purification treatment prior to the washing operation. This purification treatment can consist of any treatment known to those skilled in the art, which is intended to reduce the content of impurities. It can be, for example, a distillation or an adsorption, for example on a column packed with active charcoal, with alumina or with an ion-exchange resin, for example a mixture of a cation-exchange resin and an anion-exchange resin, or alternatively a separate bed containing the anion-exchange resin followed or preceded by a bed of cation-exchange resin.

In one variant of the process, which is preferred, the treatment to purify the organic solvent is carried out by steam stripping. The technique of steam stripping is known, for example, in "Handbook of separation techniques for chemical engineers, McGraw-Hill, 1996, part 1, pp. 249–274". In the case of a mixture of nonpolar organic solvent and a polar organic solvent, the purification by steam stripping has the advantage that it leads to a polarity which favours the removal of the impurities. The weight ratio between the nonpolar organic solvent and the polar organic solvent in the mixture after purification is preferably less than or equal to 4. In a particularly preferred manner, this ratio is less than or equal to 3.

In the process according to the invention, the aqueous hydrogen peroxide solution can be obtained according to any method known to those skilled in the art. Preferably, the hydrogen peroxide solution is obtained according to the alkylanthraquinone process. The expression "alkylanthraquinone process" is intended to denote a process for producing an aqueous hydrogen peroxide solution which consists in subjecting a working solution of at least one alkylanthraquinone and/or of at least one tetrahydroalkylanthraquinone to a hydrogenation step, in a diluent, to produce one or more alkylanthrhydroquinones and/or alkyltetrahydroanthrahydro-quinones. Diluents which may be used are the liquids which can be used as organic solvent, described above. The working solution leaving the hydrogenation step is then subjected to an oxidation by means of oxygen, air or oxygen-enriched air to give hydrogen peroxide and to reform the alkylanthraquinones and/or alkyltetrahydro-anthraquinones. The hydrogen peroxide formed is then separated from the working solution by means of an extraction step, for example using water, the hydrogen peroxide being recovered in the form of a crude aqueous hydrogen peroxide solution. The working solution leaving the extraction step is then recycled into the hydrogenation step in order to recommence the hydrogen peroxide production cycle.

The term "alkylanthraquinones" is intended to denote 9,10-anthraquinones substituted in position 1, 2 or 3 with at least one alkyl side chain of linear or branched aliphatic type comprising at least one carbon atom. Usually, these alkyl chains comprise less than 9 carbon atoms and, preferably, less than 6 carbon atoms. Examples of such alkylanthraquinones are 2-ethylanthraquinone, 2-isopropylanthraquinone, 2-sec- and 2-tert-butylanthraquinone, 1,3-, 2,3-, 1,4- and 2,7-dimethylanthraquinone, 2-iso- and 2-tert-amylanthraquinone and mixtures of these quinones.

The term "alkylanthrahydroquinones" is intended to denote the 9,10-hydroquinones corresponding to the 9,10-alkylanthraquinones specified above.

According to one variant of the process according to the invention, the aqueous hydrogen peroxide solution obtained from the washing operation is subjected to at least one subsequent purification step. This step serves in particular to remove or reduce the content of organic solvent entrained from the washing operation. The subsequent purification step can consist of any method which is well known to those skilled in the art for reducing the impurity content of an aqueous hydrogen peroxide solution. A distillation step is suitable for use. This variant of the process according to the invention gives aqueous hydrogen peroxide solutions with a TOC (total organocarbon concentration), defined according to ISO standard 8245, of less than or equal to 72 mg/l, preferably less than or equal to 36 mg/l. TOC values of less than or equal to 12 mg/l can even be reached.

In one specific embodiment of the process according to the invention, the organic solvent is a part of the working solution used in the alkylanthraquinone process. This embodiment makes it possible to modify the feed flow rate of organic solvent in the operation for washing the crude aqueous hydrogen peroxide solution obtained according to the alkylanthraquinone process. It is in fact desirable to provide a flow rate of organic solvent which is sufficient to feed the operation for washing an aqueous hydrogen peroxide solution. It is particularly desirable to be able to adjust the flow rate of organic solvent as a function of the desired washing efficacy and as a function of the amount of crude aqueous hydrogen peroxide solution to be subjected to the washing operation.

In the alkylanthraquinone process, the working solution is available in an amount which is large enough to make it possible to take an amount of organic solvent which is required to reach the desired feed flow rate of organic solvent.

The process according to the present invention has economic and technical advantages since it avoids the use of large amounts of fresh organic solvent to feed the washing step. Fresh organic solvents are more expensive than purified solvents. Large amounts are difficult to generate since it is necessary to ensure a continuous feed of fresh organic solvent and its destruction after the washing operation.

In the process according to the invention, the organic solvent, after washing, can be subjected to a regeneration treatment It can then be recycled into the washing step. It can also be recycled into the purification step. If necessary, it can be recycled into the working solution used in the alkylanthraquinone process.

The regeneration treatment consists, for example, in subjecting the solvent to one or more extractions, and to one or more treatments with a chemical reagent which is compatible with the organic solvent, in order to destroy the impurities. The extraction can be performed using water. An alkaline reagent can be used, for example, as chemical reagent.

Alkaline reagents which can be used, for example, are an aqueous solution of an alkali metal or alkaline-earth metal hydroxide or alternatively an aqueous anmnonia solution. A treatment carried out by mixing the organic solvent with an aqueous sodium hydroxide solution gives good results. Preferably, the treatment is carried out with a 1 to 2 N aqueous sodium hydroxide solution at 80° C.

A sequence of three steps: extraction with water, reaction with an aqueous solution of an alkaline reagent followed by further washing with water, gives good results. The aim of the first extraction step with water is to extract the small amount of hydrogen peroxide in dissolved form in the organic solvent. This hydrogen peroxide itself can also be recovered and recycled in the oxidation unit. The second step of reaction with an aqueous solution of an alkaline reagent has the aim of destroying a certain number of organic impurities such as organic peroxides, and the third step of washing with water has the aim of extracting the soluble decomposition products generated in the second step, as well as the excess of alkaline reagent used in this step.

A subject of the invention is also an aqueous hydrogen peroxide solution with a reduced content of organic impurities, i.e. an aqueous hydrogen peroxide solution with a TOC, defined according to ISO standard 8245, of less than or equal to 72 mg/l. Preferably, the TOC is less than or equal to 36 mg/l.

Specific solutions according to the invention contain less than 30 mg/l of organic compounds comprising from 7 to 11 carbon atoms and at least one oxygen atom, and have a boiling point of 200° C. to 300° C. Preferably, the solution contains less than 15 mg/l of organic compounds comprising from 7 to 11 carbon atoms and at least one oxygen atom and having a boiling point of 200° C. to 300° C.

The organic compound content of the aqueous hydrogen peroxide solutions, expressed in mg/l, is derived, on the one hand, from the determination of the TOC, defined according to ISO standard 8245, and, on the other hand, from the GC/MS analysis of the contributions of various organic compounds to the TOC.

The aqueous hydrogen peroxide solutions according to the invention generally have a hydrogen peroxide concentration of at least 10% by weight and usually of at least 30%. Similarly, these solutions generally contain not more than 80% by weight of hydrogen peroxide and usually not more than 75%.

The solutions according to the invention can be obtained, for example, according to the process described above.

The invention also relates to a plant for producing hydrogen peroxide by the alkylanthraquinone process, this plant comprising a unit for hydrogenating an organic working solution containing the dissolved alkylanthraquinones, a unit for oxidizing the hydroquinones produced in the hydrogenation unit, a unit for extracting the hydrogen peroxide from the working solution and a unit for washing the crude aqueous hydrogen peroxide solution obtained from the extraction unit, the washing unit being fed with organic solvent from a purification unit.

The plant is moreover described in greater detail in the description hereinbelow which refers to the FIGURE in the attached drawing, which is a schematic representation of one preferred embodiment of the plant according to the invention.

The plant essentially comprises a hydrogenation unit 1 fed with hydrogen gas 8 and with the organic working solution containing the alkylanthraquinones via the pipe 9. The hydrogenated working solution containing the alkylanthrahydroquinones leaves the hydrogenation unit 1 via the pipe 10 and enters the oxidation unit 2 fed with air 11. The oxidation unit 2 moreover receives, via the pipe 16, the aqueous solution recycled from the extraction unit 4. After oxidation, the mixture of organic working solution and recycled aqueous solution leaves the oxidation unit 2 via the pipe 12 and enters a separator 3 in which the organic phase leaving the separator 3 via the pipe 13 is separated from the aqueous phase leaving the separator via the pipe 14. The pipe 13 enters the extraction unit 4 which is moreover fed with pure water via the inlet 15. The aqueous solution leaving the extraction unit 4 and containing the hydrogen peroxide is recycled into the oxidation unit via the pipe 16. The organic working solution depleted of hydrogen peroxide leaves the extraction unit 4 via the pipe 9 and is then recycled into the hydrogenation unit 1 to recommence a new production cycle therein.

The crude aqueous hydrogen peroxide solution leaving the separator 3 via the pipe 14 is introduced into a washing unit 5 fed, via the pipe 17, with organic solvent from a purification unit 6. The extraction unit 7 and the washing unit 5 can consist of any apparatus which is well known per se for extracting a solute from a liquid by means of another liquid which is immiscible in the first, such as, for example, centrifugal extractors or liquid/liquid extraction columns operating in counter-current. Liquid/liquid extraction columns are preferred. The purification unit 6 is fed with organic solvent via the pipes 20 and 18.

In one variant of the plant, which is preferred, the purification unit 6 receives some of the working solution taken by the pipes 26 and 18. The purification unit can comprise, for example, one or more distillation, adsorption or steam stripping units.

The purified aqueous hydrogen peroxide solution leaves the washing unit 5 via the pipe 19 which can lead, for example, to a storage container or a distillation unit.

The organic solvent leaves the washing unit 5 via the pipe 21. In one variant of the plant according to the invention, an organic solvent regeneration unit 7 receives the organic solvent leaving the washing unit via the pipe 21. The regeneration unit is fed, via the pipe 27, with pure water and/or a chemical reagent as described above. This organic solvent regeneration unit can comprise, for example, one or more units for treatment with pure water and one or more reactors fed with an aqueous NaOH solution.

According to variants of the plant according to the invention, the plant comprises one or more of the pipes 22 to 25, intended to recycle the organic solvent leaving the regeneration unit 7 into the washing unit via the pipe 22, into the purification unit via the pipe 23, into the oxidation unit via the pipe 24 and/or into the hydrogenation unit via the pipe 25.

The examples given below are intended to illustrate the invention without, however, limiting it.

EXAMPLE 1

A flow rate of 1800 kg/h of a crude aqueous hydrogen peroxide solution, obtained according to the alkylanthraquinone process and having a hydrogen per-oxide content of 40% by weight and a TOC of 315 mg/l, is introduced into a washing unit containing 3.8 $m^3$ of organic solvent taken from the working solution used in the alkylanthraquinone process, the working solution being composed essentially of alkyl-substituted benzene derivatives and diisobutylcarbinol, and the solvent having undergone a steam stripping operation. Table 1 summarizes the organic solvent feed flow rates in the washing unit and the TOC of the washed and distilled aqueous hydrogen peroxide solution, which has a hydrogen peroxide content of 60% by weight.

TABLE 1

| No. | Flow rate of organic solvent [l/h] | TOC (60% by weight concentrated hydrogen peroxide) [mg/l] |
|---|---|---|
| 1A | 25 | 56 |
| 1B | 50 | 37 |

EXAMPLE 2 (not in accordance with the invention)

The same procedure as in Example 1 is followed, replacing the organic solvent, which has undergone a steam stripping operation, with an organic solvent recovered industrially in the vents of the oxidation column in the alkylanthraquinone process. Table 1 summarizes the organic solvent feed flow rate for the washing unit and the TOC of the aqueous hydrogen peroxide solution washed according to the process not in accordance with the invention and distilled, having a hydrogen peroxide content of 60% by weight.

TABLE 2

| No. | Flow rate of organic solvent [l/h] | TOC (60% by weight concentrated hydrogen peroxide) [mg/l] |
|---|---|---|
| 2 (not in accordance with the invention) | 6 | 99 |

It is seen that the process according to the invention makes it possible to reduce the TOC of the distilled hydrogen peroxide solution by 62.6%.

EXAMPLE 3

The organic compounds contained in an aqueous hydrogen peroxide solution with a hydrogen peroxide content of 40% by weight, obtained according to the alkylanthraquinone process and washed according to a procedure in accordance with Example 2 (not in accordance with the invention), are analysed by GC/MS. The concentrations of the organic compounds are determined by GC.

The content of compounds comprising from 7 to 11 carbon atoms and at least one oxygen atom and having a boiling point of from 200° C. to 300° C. is 36 mg/l. The TOC is 148 mg/l.

The purified aqueous hydrogen peroxide solution is subjected to a distillation. The hydrogen peroxide content of the solution after distillation is 60% by weight.

The content of compounds comprising from 7 to 11 carbon atoms and at least one oxygen atom and having a boiling point of from 200° C. to 300° C. is 49 mg/l. The TOC is 125 mg/l.

An accumulation of compounds comprising from 7 to 11 carbon atoms, at least one oxygen atom and having a boiling point of 200° C. to 300° C. is observed in the distilled hydrogen peroxide solution.

EXAMPLE 4

The organic compounds contained in a washed aqueous hydrogen peroxide solution obtained according to a procedure similar to that of Example 1 are analysed by GC. The content of compounds comprising from 7 to 11 carbon atoms and at least one oxygen atom and having a boiling point of from 200° C. to 300° C. is 11 mg/l.

What is claimed is:

1. A process for manufacturing a purified aqueous hydrogen peroxide solution, comprising:
    purifying at least one organic solvent by steam stripping; and
    subjecting a crude aqueous hydrogen peroxide solution to a washing operation with said at least one organic solvent.

2. The process according to claim 1, wherein the organic solvent comprises a mixture of a nonpolar organic solvent and a polar organic solvent, in a weight ratio of less than or equal to 4.

3. The process according to claim 2, wherein the polar organic solvent comprises diisobutylcarbinol.

4. The process according to claim 1, wherein the washing operation is carried out with a volume of organic solvent of from 3 to 100 l per $m^3$ of crude aqueous hydrogen peroxide solution.

5. The process according to claim 1, wherein the crude aqueous hydrogen peroxide solution is obtained according to the alkylanthraquinone process.

6. The process according to claim 5, wherein the at least one organic solvent is a part of a working solution used in the alkylanthraquinone process.

7. The process according to claim 6, wherein, after the washing operation, the at least one organic solvent is subjected to a regeneration treatment and recycled into the working solution used in the alkylanthraquinone process.

8. The process according to claim 7, wherein the treatment for regenerating the organic solvent comprises mixing the organic solvent with an aqueous sodium hydroxide solution.

9. The process according to claim 1, further comprising subjecting the at least one organic solvent to a regeneration treatment and recycling the regenerated organic solvent into the washing operation.

10. The process according to claim 1, further comprising subjecting the at least one organic solvent to a regeneration treatment and recycling the regenerated organic solvent into the purification step.

11. The process according to claim 1, wherein the purified aqueous hydrogen peroxide solution is subjected to a subsequent purification step after the washing operation.

12. The process according to claim 11, wherein the subsequent purification step is a distillation.

* * * * *